United States Patent
Fite et al.

(10) Patent No.: US 7,995,676 B2
(45) Date of Patent: Aug. 9, 2011

(54) INTERPOLATION PROCESSING FOR ENHANCED SIGNAL ACQUISITION

(75) Inventors: John D. Fite, Clifton, VA (US); John W. Betz, Bedford, MA (US)

(73) Assignee: The MITRE Corporation, McLean, VA (US)

( * ) Notice: Subject to any disclaimer, the term of this patent is extended or adjusted under 35 U.S.C. 154(b) by 1566 days.

(21) Appl. No.: 11/340,841

(22) Filed: Jan. 27, 2006

(65) Prior Publication Data

US 2007/0177699 A1     Aug. 2, 2007

(51) Int. Cl.
*H03K 9/00*     (2006.01)
(52) U.S. Cl. ......... 375/316; 375/150; 375/343; 367/134
(58) Field of Classification Search .................. 375/316, 375/150, 343; 367/134
See application file for complete search history.

(56) References Cited

U.S. PATENT DOCUMENTS

| | | | | |
|---|---|---|---|---|
| 5,982,763 | A * | 11/1999 | Sato ............................. | 370/342 |
| 6,512,720 | B1 * | 1/2003 | Yang ............................. | 367/134 |
| 6,611,560 | B1 * | 8/2003 | Kresch et al. ............. | 375/240.16 |
| 7,010,023 | B1 * | 3/2006 | Sato ............................. | 375/150 |
| 7,221,701 | B2 * | 5/2007 | Arikan et al. ................. | 375/148 |
| 2005/0002445 | A1 * | 1/2005 | Dunyak et al. ............... | 375/148 |

OTHER PUBLICATIONS

Robert J. Ulman et al., "Wideband TDOA/FDOA Processing Using Summation Of Short-Time CAF's", IEEE Transactions On Signal Processing, Dec. 1999, pp. 3193-3200, vol. 47, No. 12.

Seymour Stein, "Algorithms For Ambiguity Function Processing", IEEE Transaction On Acoustics, Speech, And Signal Processing, Jun. 1981, pp. 588-599, vol. ASSP-29, No. 3.

A.J.R.M. Coenen et al., "FFT-Based Interpolation For Multipath Detection In GPS/GLONASS Receivers", Electronic Letters, Sep. 1992, pp. 1787-1788, vol. 28, No. 19.

Sverre Holm, "FFT Pruning Applied To Time Domain Interpolation And Peak Localization", IEEE Transactions On Acoustics, Speech, And Signal Processing, Dec. 1987, pp. 1776-1778, vol. ASSP-35, No. 12.

X. Lai et al., "Interpolation Method For Time Delay Estimation In The RF-Signal Crosscorrelation Technique For Blood Velocity Measurement", 1996 IEEE Ultrasonics Symposium, pp. 1211-1216.

Hyuck M, Kwon et al., "Third-Generation TDRSS-Compatible Direct-Sequence Spread-Spectrum Digital Receiver", IEEE Transactions On Vehicular Technology, Nov. 1997, pp. 891-899, vol. 46, No. 4.

S.B. Colegrove et al., "A Peak-Detector That Picks More Than Peaks", pp. 167-171.

(Continued)

*Primary Examiner* — Shuwang Liu
*Assistant Examiner* — Michael R Neff
(74) *Attorney, Agent, or Firm* — Sterne Kessler Goldstein & Fox, P.L.L.C.

(57) ABSTRACT

The present invention relates to methods and systems for enhanced signal acquisition through cross-ambiguity function (CAF) interpolation. In one aspect, the present invention provides methods and systems for CAF interpolation. In an embodiment, a first CAF generated using a low input sampling rate (e.g., 1 sample/chip) is interpolated to generate a second CAF having a higher sample per chip rate. By lowering the initial input sampling rate, cost and complexity of initial synchronization processing can be significantly reduced at the receiver. In another aspect, coherent and non-coherent interpolation methods and systems are provided for time and frequency CAF interpolation. Low cost and low complexity implementations of these methods and systems are also provided with associated CAF peak detection methods and systems.

19 Claims, 7 Drawing Sheets

OTHER PUBLICATIONS

Chu-xiong Ding et al., "Peak Position Estimation Algorithms For Cross-Correlation Function In Elastography", Proceedings of the 20$^{th}$ Annual International Conference of the IEEE Engineering In Medicine And Biology Society, 1998, pp. 866-868, vol. 20, No. 2.

William W. Jones et al., "Post Acquisition PN Code Uncertainty Reduction By Least-Squares Interpolation", IEEE MILCOM, 1991, pp. 804-808.

Mohammad H. Zarrabizadeh et al., "Analysis Of A Differentially Coherent Spread-Spectrum Acquisition Receiver", IEEE, 1995, pp. 1732-1736.

L. Auslander et al., "Computing Decimated Finite Cross-Ambiguity Functions", IEEE Transactions On Acoustics, Speech And Signal Processing, Mar. 1988, pp. 359-364, vol. 36, No. 3.

George Papadopoulos et al., "Implementation Of An Intelligent Instrument For Passive Recognition And Two-Dimensional location Estimation Of Acoustic Targets", IEEE, 1992, pp. 66-70.

D.I. Lekhovitsky et al., "On Losses Of Coherent Signal In The Adaptive Detector With Non-Coherent Integration", IEEE, International Conference on Antenna Theory and Techniques, Sevastopol, Ukraine, Sep. 2003, pp. 36-41.

Keith A. Struckman, "Correlation Of Interpolated Time Delayed Communication Signals", IEEE, 1984, pp. 46.3.1-46.3.4.

Won Namgoong et al., "Minimizing Power Consumption In Direct Sequence Spread Spectrum Correlators By Resampling IF Samples—Part I: Performance Analysis", IEEE Transactions On Circuits And Systems-II: Analog And Digital Signal Processing, May 2001, pp. 450-459, vol. 48, No. 5.

Babak Soltanian et al., "Complexity Analysis Of An Interpolation Based Rake Receiver For WCDMA Systems", IEEE, 2001, pp. 3528-3532.

S. Lawrence Marple, Jr., "Estimating Group Delay and Phase Delay Via Discrete-Time "Analytic" Cross-Correlation", IEEE Transactions On Signal Processing, Sep. 1999, pp. 2604-2607, vol. 47, No. 9.

Gunnar Wetzker et al., "Incoherent Acquitision Of DSSS Signals In Presence Of Doppler Shifts", IEEE, 1996, pp. 166-170.

F. Marvasti, "Interpolation Of Lowpass Signals At Half The Nyquist Rate", IEEE, 1995, pp. 1225-1228.

E. Brinkmeyer et al., "Efficient Algorithm For Non-Equidistant Interpolation Of Sampled Data", Electronics Letters, Mar. 1992, pp. 693-695, vol. 28, No. 7.

V.K. Jain, "DFT Interpolation For Estimation Of Tone Amplitudes And Phases", IEEE, 1980, pp. 662-665.

Geoff B. Irvine et al., "Algorithms For The Nonuniform Acquisition And Subsequent Reconstruction Of Data", IEEE, 2002, pp. 791-794.

T.J. Cavicchi, "DFT Time-Domain Interpolation", IEE Proceedings, Jun. 1992, pp. 207-211, vol. 139, No. 3.

Katrien Bucket et al., "Chip Synchronization Performance Affected By Non-Ideal Interpolation Of Bandlimited Direct-Sequence Spread-Spectrum Signals", pp. 52-59.

Brent M. Ledvina et al., "Bit-Wise Parallel Algorithms For Efficient Software Correlation Applied To A GPS Software Receiver", IEEE, 2004, pp. 1469-1473.

Won Namgoong et al., "Minimizing Power Consumption In Direct Sequence Spread Spectrum Correlators By Resampling IF Samples—Part II: Implementation Issues", IEEE Transactions On Circuits And Systems-II: Analog And Digital Signal Processing, May 2001, pp. 460-470, vol. 48, No. 5.

Ching-Hung Chiou et al., "A Programmable Pipelined Digital Differential Matched Filter For DSSS Receiver", IEEE Journal On Selected Areas In Communications, Nov. 2001, pp. 2142-2150, vol. 19, No. 11.

Byoung—Hoon Kim et al., "Distributed Sample Acquisition-Based Fast Cell Search In Inter-Cell Asynchronous DS/CDMA Systems", IEEE Journal On Selected Areas In Communications, Aug. 2000, pp. 1455-1469, vol. 18, No. 8.

\* cited by examiner

INTERPOLATION PROCESSING FOR ENHANCED SIGNAL ACQUISITION

STATEMENT REGARDING FEDERALLY SPONSORED RESEARCH AND DEVELOPMENT

The U.S. government has a paid-up license in this invention and the right in limited circumstances to require the patent owner to license others on reasonable terms as provided for by the terms of Contract No. FA8721-04-C-0001 awarded by the United States Air Force.

FIELD OF THE INVENTION

The present invention relates generally to initial synchronization processing for signal acquisition. More particularly, the invention relates to methods and systems for enhanced signal acquisition through cross-ambiguity function (CAF) interpolation.

BACKGROUND OF THE INVENTION

Synchronization between transmitter and receiver is essential for correct signal acquisition. Typically, synchronization is achieved by transmitting a sequence known both at the transmitter and the receiver, receiving the transmitted sequence at the receiver, and matching the received sequence to a locally-generated replica thereof to determine the start of the sequence.

The process of matching the received sequence to the locally-generated replica includes determining time and frequency offsets between the received sequence and the replica. Typically, this is done by cross-correlating both in time and frequency the received sequence and the replica, sampling the resulting cross-correlation results to generate a cross ambiguity function (CAF) surface, and detecting a peak value in the CAF surface corresponding to estimates of the time and frequency offsets.

In practice, however, because only discrete samples of the CAF surface are calculated, determining the actual time and frequency offsets between the received sequence and the replica may not be possible. Typically, the actual time and frequency offsets are not aligned with sample points of the CAF, thereby resulting in what is known as off-bin loss and a degradation in peak detection performance.

In trying to minimize off-bin loss, conventional methods oversample the received sequence to generate a large number of CAF samples, thereby reducing off-bin loss and increasing the probability of peak detection. These methods use a temporal sampling rate that is high enough to place at least three sample points on the main peak of the autocorrelation function of the sequence. For certain types of signals, such as binary phase-shift keyed signals with rectangular symbols (BPSK-R), this corresponds to a sampling rate that is twice the chip rate (2 samples/chip) of the received sequence.

It has been shown, however, that the complexity of initial synchronization processing increases with more than the square of the temporal sampling rate, and that the storage required increases linearly with the sampling rates in time and frequency. Using oversampling to limit off-bin loss, accordingly, significantly affects the cost and complexity of the receiver.

What is needed, therefore, are methods and systems for initial synchronization processing that provide reduced cost and complexity at the receiver while maintaining a good peak detection performance.

BRIEF SUMMARY OF THE INVENTION

The present invention relates to methods and systems for enhanced signal acquisition through cross-ambiguity function (CAF) interpolation.

In one aspect, the present invention provides methods and systems for CAF interpolation. In an embodiment, a sparsely sampled CAF generated using a low input sampling rate (e.g., 1 complex sample/chip) is interpolated to generate a more densely sampled CAF having a higher sample per chip rate. By lowering the initial input sampling rate, cost and complexity of initial synchronization processing can be significantly reduced at the receiver.

In another aspect, coherent and non-coherent interpolation methods and systems are provided for time and frequency CAF interpolation. Low cost and low complexity implementations of these methods and systems are also provided with associated CAF peak detection methods and systems.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

Introduction

Methods and systems of the present invention represent a novel approach to the use of interpolation in initial synchronization for signal acquisition.

In one aspect, embodiments of the present invention eliminate the need for less efficient oversampling at the receiver while maintaining peak detection performance at levels comparable to those of conventional oversampling techniques. To achieve that peak detection performance, embodiments of the present invention exploit the fact that interpolation processing before peak detection can be used to generate a densely sampled cross-ambiguity function (CAF) surface while employing low sampling rates at the receiver.

In another aspect, embodiments of the present invention provide a set of CAF interpolation techniques for both coherent and non-coherent interpolation. Peak detection techniques for each type of CAF interpolation are also provided.

Embodiments of the present invention will now be provided. While certain embodiments will be described in the context of spread spectrum signal acquisition, this is done for illustration purposes only and should not be used to limit the present invention to such signals. As will be understood by a person skilled in the relevant art(s) based on the teachings herein, embodiments of the present invention can be extended to the general context of sequence synchronization regardless of the type of signals being synchronized.

Conventional Signal Acquisition

As described above, initial synchronization between a transmitter and a receiver involves determining accurate estimates of actual time and frequency offsets between a transmitted sequence and a replica thereof at the receiver.

Typically, this is done by cross-correlating the transmitted sequence and the replica to calculate cross-correlation results at multiple samples of time and frequency offsets, thereby generating what is known as a sampled cross-ambiguity function (CAF) surface. The sampled CAF represents a three-dimensional representation of the cross-correlation results in time and frequency. The largest peak in the CAF surface above the detection threshold corresponds to estimates of time and frequency offsets that most closely approximate the actual time and frequency offsets in the sampled CAF.

Accordingly, for optimal synchronization it is desired that the CAF be sampled densely enough to increase the probability of closely approximating the actual time and frequency offsets. Conventional initial synchronization methods oversample the received sequence to generate such a dense CAF surface. Oversampling, as described above, however, significantly increases the cost and complexity of the receiver, thereby reducing the number of effective applications of such methods.

Figure 1:
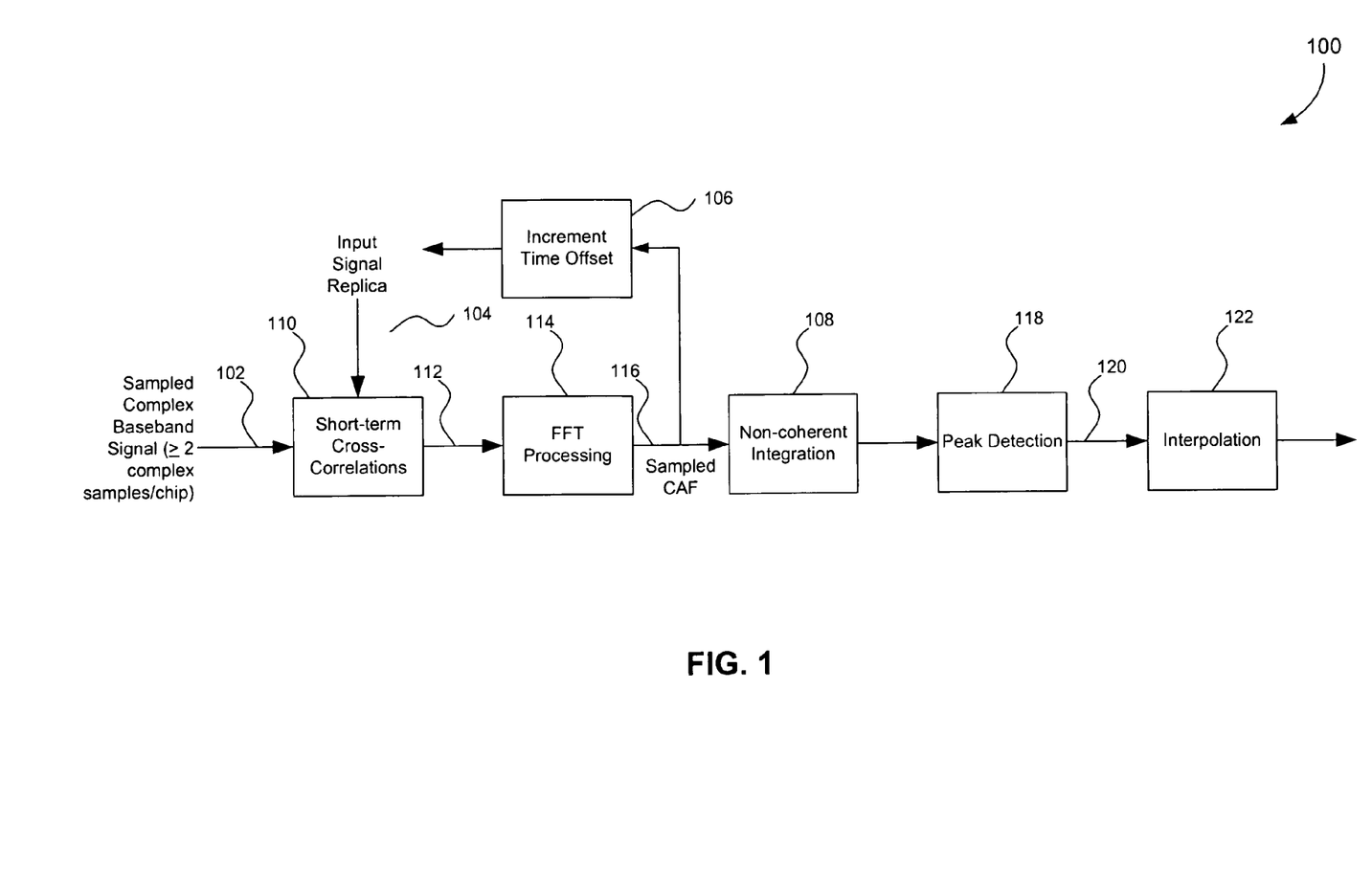
FIG. 1 is a block diagram that illustrates a conventional method for initial synchronization.

FIG. 1 is a simplified block diagram that illustrates a conventional method 100 for initial synchronization. Method 100 begins with a sampled complex envelope of a received signal being down-converted to baseband to generate a sampled complex baseband signal 102. The received signal may be a spread spectrum signal such as the GPS M-code signal, for example.

Initial synchronization is done by matching a sequence located at the beginning of the signal, which is known both at the transmitter and at the receiver, with a replica thereof generated locally at the receiver. In conventional methods, the sample rate is high enough to place at least three sample points on the main peak of the signal's autocorrelation function. In practice, this corresponds to sampling the input signal at a rate that is at least two times the chip rate of the sequence or 2 samples per chip.

In step 110, sampled signal 102 is cross-correlated in time with time-shifted replicas 104 thereof to calculate cross-correlation results 112. Typically, the time-shifted replicas are shifted with respect to the local sequence by time offsets that are according to the sampling rate of the input signal. For example, for a sampling rate of 2 samples/chip, any two time-shift adjacent replicas are shifted by a half of a chip time relative to one another.

In step 114, multiple short-term cross-correlation results 112, representing the same time offset but computed at different instants of time, are input into a Fast Fourier Transform (FFT) to generate correlations in frequency over multiple frequency offset values. Note that interpolation in the frequency domain is typically done by zero-padding the FFT. Steps 110 and 114 are repeated for different time offsets as illustrated by the loop created by steps 110, 114, and 106. The output 116 of the FFT represents a cross-ambiguity function (CAF) surface sampled at different time and frequency offsets.

In step 108, multiple sampled CAFs are non-coherently summed together to improve peak detection performance. For each time and frequency offset, the squared magnitudes of cross-correlation values from each sampled CAF, computed at different instants of time, are summed together. The non-coherent integration step 108 reduces the variance of the cross-correlation estimates and reduces the presence of spurious peaks. When non-coherent integration is used, lower peak detection thresholds can be used without increasing the probability of false alarms.

In step 118, the approximate time and frequency offset is determined by detecting the highest CAF sample that exceeds a minimum detection threshold. This is known as peak detection, and is generally done by comparing the magnitudes of the CAF samples to a detection threshold and selecting the time and frequency offset pair corresponding to the maximum magnitude that exceeds the threshold. The detection threshold is selected so the probability of reporting a false peak is very small.

Initial synchronization processing may terminate following the peak detection process, whereby a pair of estimated time and frequency offsets 120 is determined. In certain conventional methods, however, the estimated time and frequency offsets 120 are further refined in an interpolation step 122. In this step, interpolation is used to generate a more densely sampled CAF surface around the detected peak. Selection of a new maximum from among the interpolated and original values around the peak results in more accurate time and frequency offset estimates.

Enhanced Signal Acquisition Using CAF Interpolation Processing

As described above, a significant problem in conventional initial synchronization methods lies in increased receiver cost and complexity due to oversampling. It is desirable therefore to reduce the sampling rate in the computation of the sampled CAF surface, while maintaining a good peak detection performance at low signal to noise ratios.

The present invention allows for CAF sampling with larger spacing in time and frequency without significant loss in detection performance, thereby reducing the complexity of initial synchronization processing. The invention further exploits the fact that when the true offsets of a received signal are not aligned with samples of the CAF surface, signal power is spread among adjacent sample points. Accordingly, embodiments of the present invention interpolate over multiple CAF sample points to collect this power, thereby reducing off-bin loss as well as the probability of missed detections. Methods and systems of the present invention that provide enhanced signal acquisition through CAF interpolation processing will now be presented.

Figure 2:
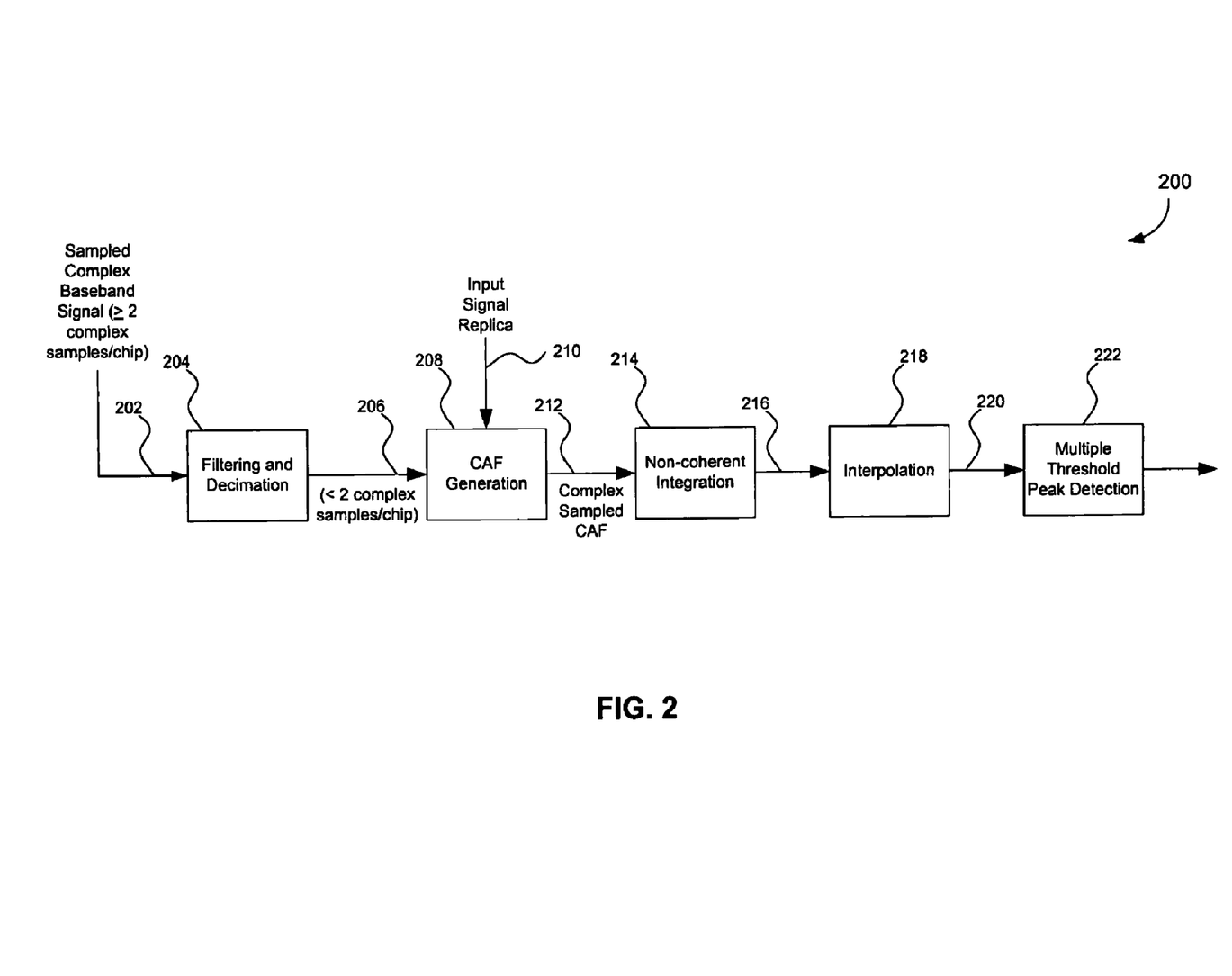
FIG. 2 is a block diagram that conceptually illustrates a method for initial synchronization, according to an embodiment of the present invention.

FIG. 2 is a block diagram that conceptually illustrates a method 200 for initial synchronization, according to an embodiment of the present invention. Method 200 begins in step 204, which includes low-pass filtering and decimating a complex baseband sampled signal 202 (which initially has ≧2 complex samples/chip) to a sampling rate that is lower than 2 samples per chip to generate sampled signal 206.

In step 208, sampled signal 206 is cross-correlated with time and frequency replicas 210 to generate a sparsely sampled CAF. The resulting output 212 of step 208 is a first CAF surface having samples per chip according to the sampling rate of the input signal. In an embodiment, the first CAF has one sample per chip. In another embodiment, a zero-padded FFT is used, thereby resulting in a frequency-oversampled first CAF.

As with the conventional method of FIG. 1, in step 214, multiple sampled CAFs representing the same time and frequency offset region are non-coherently integrated to reduce the noise variance and improve detection performance at lower signal to noise ratios. The output of the non-coherent integration step 214 is a real-valued CAF 216 having the same granularity as the original CAF.

In step 218, the real-valued CAF 216 is interpolated in time and frequency to generate a second more densely sampled CAF 220. In one embodiment, interpolation is done only in time in step 218 when oversampling in frequency is achieved through zero-padding in step 208. Note that interpolation is done over the entire first CAF surface and not just over certain areas of the CAF where peak values may lie. An important feature of the present invention is that interpolation is done prior to peak detection, which is done in step 222.

In step 222, a peak value is detected in the second CAF by comparing magnitudes of the second CAF samples to pre-determined detection thresholds. Details on multiple threshold peak detection and corresponding detection logic are further described below. Once samples above their corresponding thresholds have been detected, the sample corresponding to the maximum magnitude is selected. The maximum typically corresponds to estimates of time and frequency offsets that most closely approximate the actual time and frequency offsets of the input signal.

Figure 3:
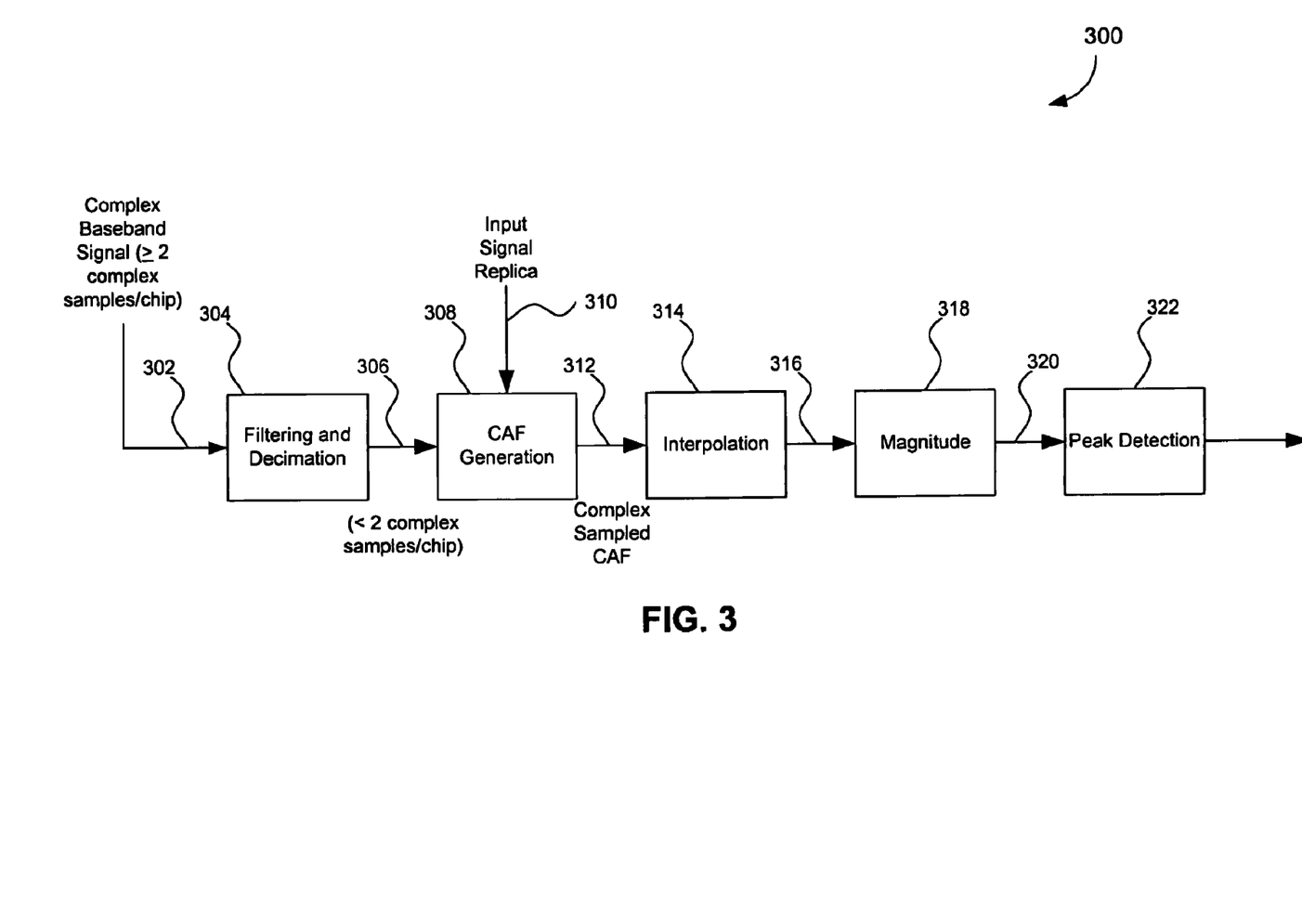
FIG. 3 is a block diagram that conceptually illustrates another method for initial synchronization, according to an embodiment of the present invention.

FIG. 3 is a block diagram that conceptually illustrates another method 300 for initial synchronization, according to an embodiment of the present invention. Method 300 begins in step 304, which includes low-pass filtering and decimating a complex baseband sampled signal 302 (which initially has ≧2 complex samples/chip) to a sampling rate that is lower than 2 samples per chip to generate sampled signal 306.

In step 308, sampled signal 306 is cross-correlated with time and frequency replicas 310 to generate a sparsely sampled CAF. The resulting output 312 of step 308 is a first CAF surface having samples per chip according to the sampling rate of the input signal. In an embodiment, the first CAF has one sample per chip. In another embodiment, a zero-padded FFT is used, thereby resulting in a frequency-oversampled first CAF.

In step 314, the first complex-valued CAF 312 is interpolated in time and frequency to generate a second complex-valued CAF 316. CAF 316 is more densely sampled than CAF 312. In one embodiment, interpolation is done only in time in step 314 when oversampling in frequency is achieved through zero-padding in step 308. Note that interpolation in step 314 is performed on complex-valued CAF samples (coherent interpolation) as opposed to real-valued samples in step 218 (non-coherent interpolation) of method 200.

In step 318, magnitudes of samples of the second CAF 316 are computed to generate real-valued samples 320. The generated samples 320 are then compared against a common detection threshold, in step 322, to detect a peak in the generated samples. The sample corresponding to the maximum is selected. The maximum typically corresponds to estimates of time and frequency offsets that most closely approximate the actual time and frequency offsets of the input signal.

It is noted here that the peak detection algorithms used for peak detection may differ according to the interpolation techniques (coherent versus non-coherent). Peak detection will be further described below.

Methods and Systems for Initial Synchronization

Initial synchronization schemes according to the present invention provide significant cost and complexity savings as would be apparent to a person skilled in the relevant art(s) based on the teachings herein. For example, by reducing the input signal sampling rate to at least one half of the typical rate of conventional methods, the arithmetic complexity of initial synchronization processing is reduced to less than the square root of that of conventional methods. Oversampling in time is, subsequently, compensated for by interpolation means of low implementation cost and complexity.

Initial synchronization methods and systems according to the present invention will now be provided. As described above, interpolation both in frequency and in time can be done using coherent or non-coherent interpolation techniques. Interpolation in frequency can be done coherently or non-coherently using an FFT as described above, with oversampling achieved by zero-padding the FFT. Time interpolation can also be done coherently or non-coherently as will be further described below. Further, CAF interpolation can be done coherently both in frequency and time, non-coherently both in frequency and time, or coherently (non-coherently) in frequency and non-coherently (coherently) in time.

Figure 4:
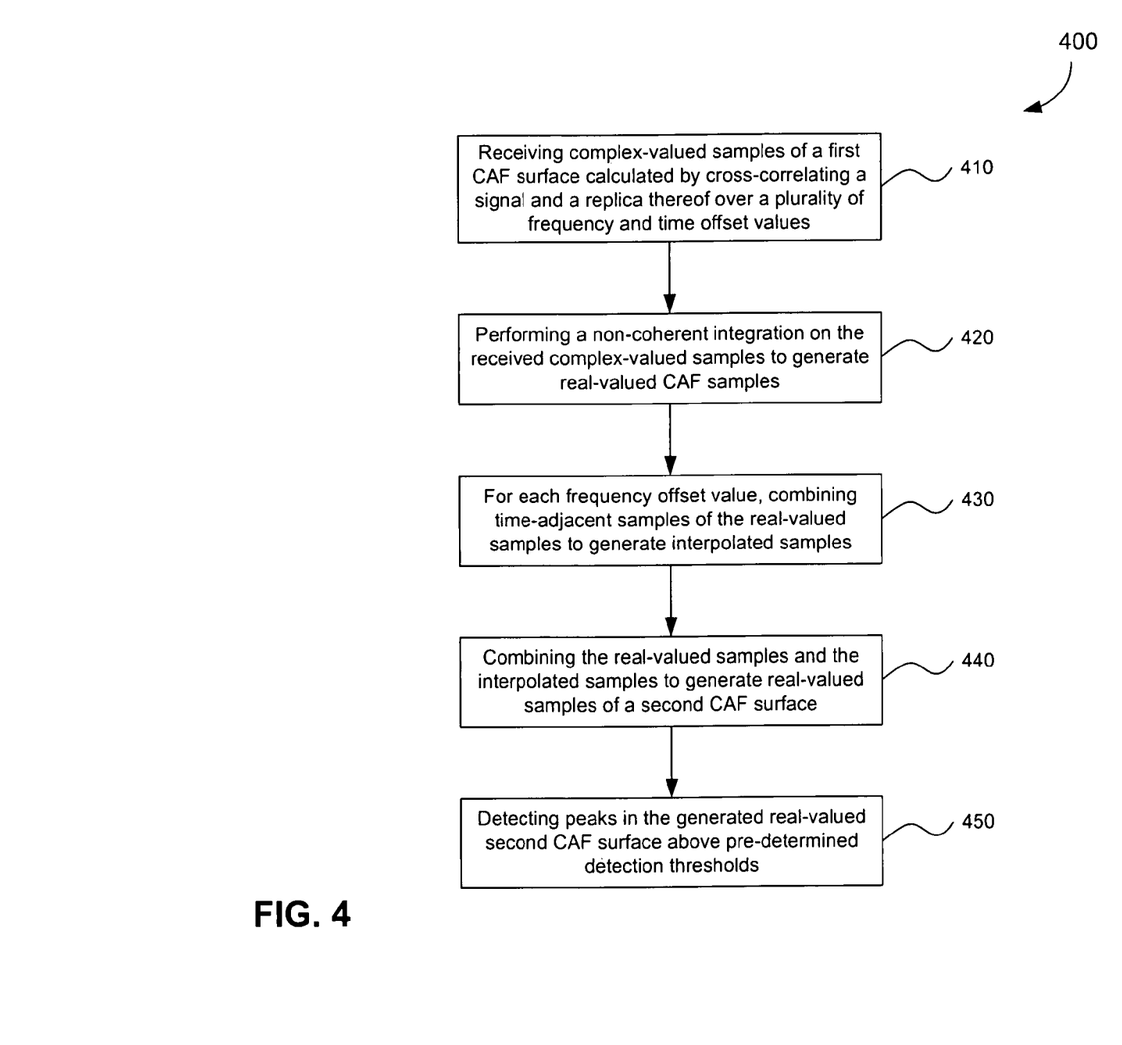
FIG. 4 is a process flowchart that illustrates a method for initial synchronization using non-coherent CAF interpolation, according to an embodiment of the present invention.

FIG. 4 is a process flowchart 400 that illustrates a method for initial synchronization using non-coherent CAF interpolation. Process flowchart 400 begins in step 410, which includes receiving complex-valued samples of a first CAF surface calculated by cross-correlating a received signal and a replica thereof over a plurality of frequency and time offset values.

Typically, the complex envelope of the received signal in baseband can be represented mathematically as:

$$x(t)=d(t-\tau)r(t-\tau)e^{j2\pi ft}+v(t) \qquad (1)$$

where d represents a baseband data signal, r represents a spreading code signal, and v represents receiver noise. τ and f represent the time and frequency offsets, respectively, of the received signal.

Complex-valued samples of the first CAF surface can also be described mathematically as follows:

$$A(n, m) = \sum_{k=-L}^{L} r(kT)x((k+n)T)e^{-j2\pi\frac{mk}{F_s}} \qquad (2)$$

where A(n,m) represents a CAF sample for time offset value (n×T) and frequency offset value (m/$F_s$), x represents the received signal plus noise, r represents the replica signal, T represents the sampling rate of the received signal, and L represents the number of samples of the received signal over which the cross-correlation is being performed.

Step 420 includes performing a non-coherent integration on the received complex-valued samples to generate real-valued samples. Typically, step 420 includes non-coherently summing together multiple sampled CAFs to improve peak detection performance. For each time and frequency offset, the squared magnitudes of cross-correlation values from each sampled CAF, computed at different instants of time, are summed together. The non-coherent integration step reduces the variance of the cross-correlation estimates and reduces the presence of spurious peaks. When non-coherent integration is used, lower peak detection thresholds can be used without increasing the probability of false alarms.

Given the real-valued CAF samples resulting from step 420, step 430 includes combining, for each frequency offset value, time-adjacent samples of the real-valued samples to generate interpolated samples. For example, step 430 includes interpolating time-adjacent CAF samples A(n,m) and A(n+1,m) for fixed frequency offset parameter m. Generally, interpolated CAF samples are computed using the following formula:

$$\hat{A}(n + \Delta n, m + \Delta m) = \sum_i \sum_j \alpha_{ij}(\Delta n, \Delta m)|A(n+i, m+j)| \quad (3)$$

where $\Delta n$ and $\Delta m$ are each a number between 0 and 1. The number of coefficients and coefficient values $\alpha_{ij}$ are a function of the selected interpolation method.

Subsequently, following interpolation in step 430, step 440 includes combining the real-valued samples and the interpolated samples generated in step 430 to generate real-valued samples of a second CAF surface. The second CAF surface is characterized by at least two times the number of samples in time as the first CAF surface.

Step 450 includes detecting peaks in the generated real-valued samples of the second CAF surface using multiple peak detection thresholds. Multiple peak detection thresholds are needed in this case since the interpolated samples and the real-valued samples of the first CAF surface have different probability distribution functions.

Figure 5:
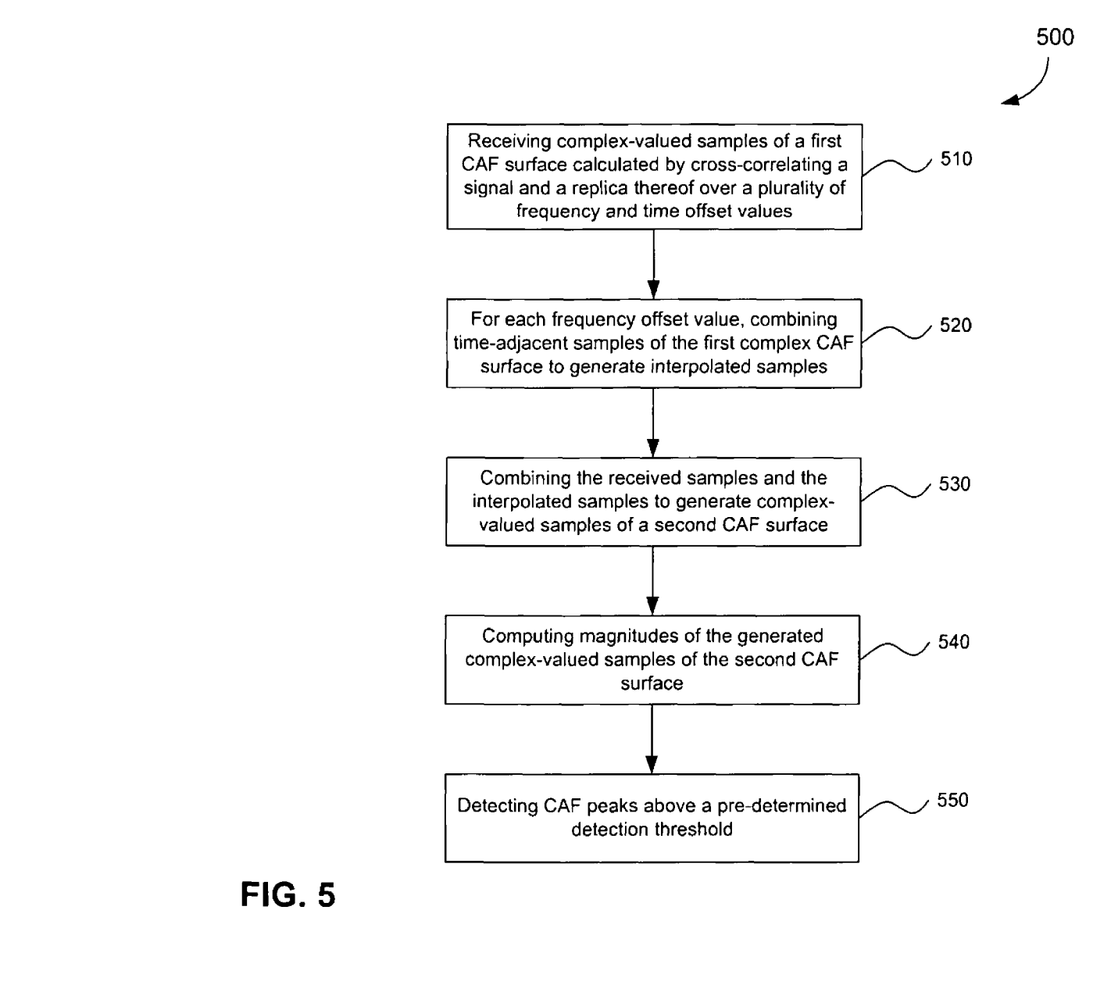
FIG. 5 is a process flowchart that illustrates a method for initial synchronization using coherent CAF interpolation, according to an embodiment of the present invention.

FIG. 5 is a process flowchart 500 that illustrates a method for initial synchronization using coherent CAF interpolation. Process flowchart 500 begins in step 510, which includes receiving complex-valued samples of a first CAF surface calculated by cross-correlating a received signal and a replica thereof over a plurality of frequency and time offset values.

Typically, the complex envelope of the received signal in baseband can be represented mathematically as:

$$x(t) = d(t-\tau)r(t-\tau)e^{j2\pi ft} + v(t) \quad (4)$$

where d represents a baseband data signal, r represents a spreading code signal, and v represents receiver noise. $\tau$ and f represent the time and frequency offsets, respectively, of the received signal.

Complex-valued samples of the first CAF surface can also be described mathematically as follows:

$$A(n, m) = \sum_{k=-L}^{L} r(kT)x((k+n)T)e^{-j2\pi \frac{mk}{F_s}} \quad (5)$$

where A(n,m) represents a CAF sample for time offset value (n×T) and frequency offset value (m/$F_s$), x represents the received signal plus noise, r represents the replica signal, T represents the sampling rate of the received signal, and L represents the number of samples of the received signal over which the cross-correlation is being performed.

Given the CAF samples as shown in (2), step 520 of process flowchart 500 includes combining, for each frequency offset value, time-adjacent samples of the first CAF to generate interpolated samples. For example, step 520 includes interpolating time-adjacent CAF samples A(n,m) and A(n+1,m) for fixed frequency offset parameter m. Generally, interpolated CAF samples are computed using the following formula:

$$A(n+\Delta n, m+\Delta m) = \Sigma_i \Sigma_j \alpha_{ij}(\Delta n, \Delta m) A(n+i, m+j) \quad (6)$$

where $\Delta n$ and $\Delta m$ are each a number between 0 and 1. The number of coefficients and coefficient values $\alpha_{ij}$ are a function of the selected interpolation method.

Subsequently, following interpolation in step 520, step 530 includes combining the received samples in step 510 and the interpolated samples generated in step 520 to generate complex-valued samples of a second CAF surface. The second CAF surface is characterized by at least two times the number of samples in time as the first CAF surface, thereby increasing the probability of accurate peak detection in subsequent peak detection steps.

Step 540 includes computing magnitudes of the generated complex-valued samples of the second CAF surface before detecting CAF peaks, in step 550, using the computed magnitudes based on a single peak detection threshold. A single peak detection threshold can be used in this case since the received samples and the interpolated samples have substantially identical probability distribution functions.

Figure 6:
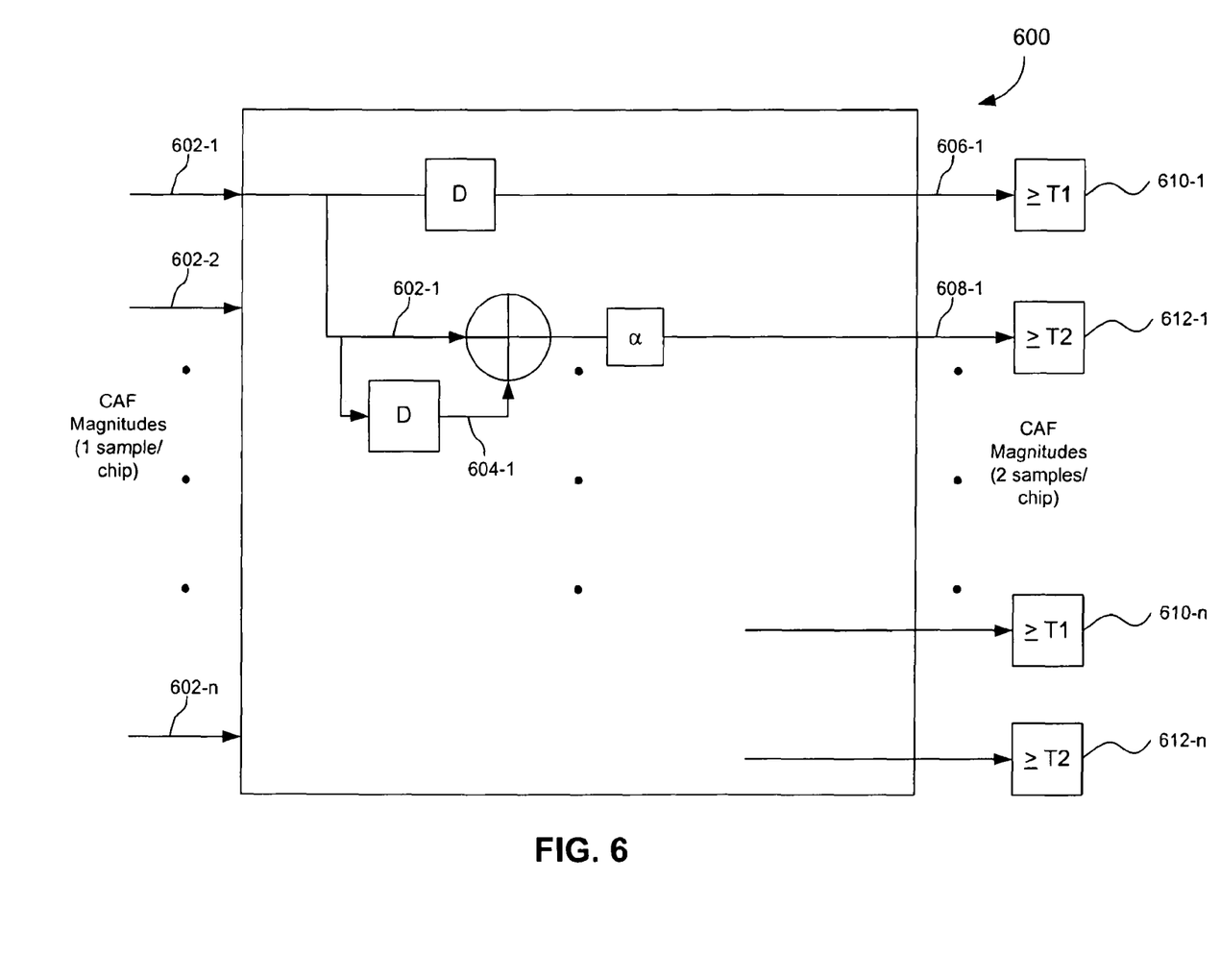
FIG. 6 is a block diagram that illustrates a system for CAF interpolation for initial synchronization, according to an embodiment of the present invention.

FIG. 6 is a block diagram that illustrates a system 600 for non-coherent time interpolation according to the present invention. System 600 may represent a non-coherent CAF time-interpolator, for example. Inputs 602-{1, ..., n} to system 600 can represent real-valued CAF samples at the output of a non-coherent integration process, wherein time adjacent samples are spaced apart by one chip in time from one another. Each of inputs 602-{1, ..., n} contains CAF samples for one frequency offset value. Further, CAF samples contained in inputs 602-{1, ..., n} may have been interpolated in frequency in subsequent stages prior to being input into system 600.

For each frequency offset value, system 600 interpolates magnitudes of time-adjacent samples to generate interpolated samples. In an embodiment, non-coherent interpolation of time-adjacent samples is done according to the following formula:

$$\hat{A}(n+\Delta n, m+\Delta m) = \Sigma_i \Sigma_j \alpha_{ij}(\Delta n, \Delta m)|A(n+i, m+j)| \quad (7)$$

where $\Delta n$ and $\Delta m$ are each a number between 0 and 1.

In an implementation, non-coherent time interpolation is done using a 2-tap filter. For example, as shown in FIG. 6, signal 602-1 is summed with a time-delayed version thereof 604-1, and then multiplied by an appropriate interpolation coefficient $\alpha$ to generate an interpolated sample contained in signal 608-1. The overall result of interpolating the real-valued CAF samples contained in inputs 602-{1, ..., n} are real-valued CAF samples 606-{1, ..., n} and 608-{1, ..., n}, wherein CAF samples 606-{1, ..., n} represent the original CAF samples and CAF sample magnitudes 608-{1, ..., n} represent the interpolated CAF samples. Time-adjacent samples of CAF samples 606-{1, ..., n} and 608-{1, ..., n} are spaced apart by one half of a chip in time (2 samples/chip) from one another.

Note that since in non-coherent interpolation, interpolation is applied onto the real-valued CAF samples, the interpolated and the original CAF samples may have different probability density functions. Accordingly, during peak detection, different detection thresholds will have to be used to detect the peak value of the CAF surface with optimum detection performance. This is illustrated, for example, in FIG. 6 by threshold blocks 610-{1, ..., n} and 612-{1, ..., n} having different threshold values $T_1$ and $T_2$.

Figure 7:
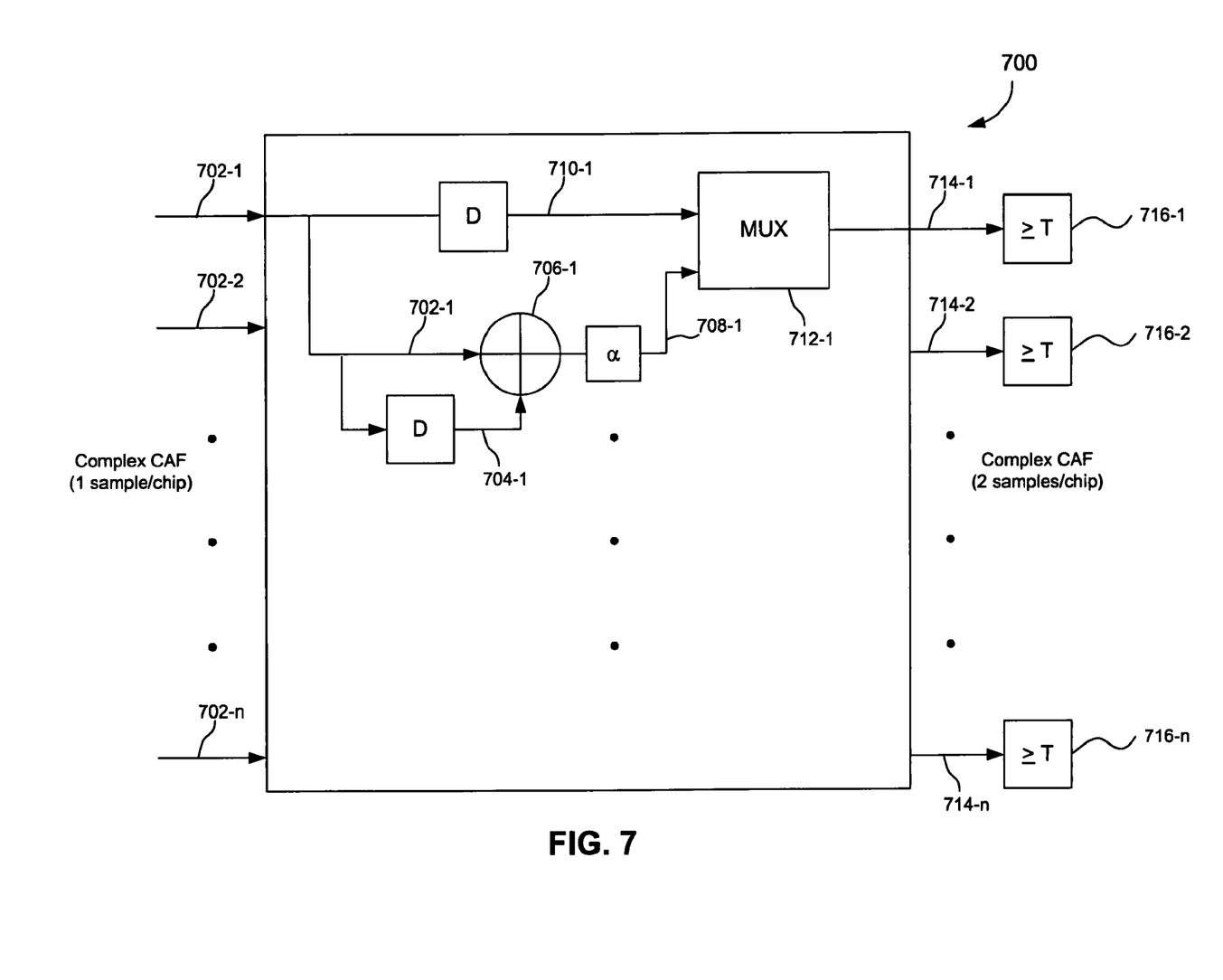
FIG. 7 is a block diagram that illustrates another system for CAF interpolation for initial synchronization, according to an embodiment of the present invention.

FIG. 7 is a block diagram that illustrates in more detail a system 700 for coherent time interpolation according to the present invention. System 700 may represent a coherent CAF time-interpolator for example. Inputs 702-{1, ..., n} to system 700 represent complex-valued CAF samples wherein time adjacent samples are spaced apart by one chip in time from one another. Each of inputs 702-{1, ..., n} contains CAF samples for one frequency offset value. Further, the CAF samples contained in each of inputs 702-{1, ..., n} may have been interpolated in frequency in subsequent stages prior to being input into system 700.

For each frequency offset value, system 700 interpolates time-adjacent CAF samples to generate interpolated samples. Generally, this is done according to the formula shown in (6). In an implementation, this is done using a 2-tap filter. For example, as shown in FIG. 7, CAF samples contained in input 702-1 are summed with time-adjacent CAF samples contained in signal 704-1 using summer 706-1. The resulting sums are multiplied by an appropriate interpolation coefficient α to generate interpolated samples illustrated using signal 708-1. In an embodiment, the interpolation coefficient α is selected such the average post-correlation noise power remains the same for both interpolated and non-interpolated samples.

Interpolated samples contained in 708-1 and time-delayed samples 710-1 of the original CAF samples contained in 702-1 are then multiplexed together using multiplexer 712-1. The overall result of interpolating the CAF samples contained in inputs 702-{1, ..., n} are CAF samples 714-{1, ..., n}, wherein time adjacent samples of CAF samples 714-{1, ..., n} are spaced apart by one half of a chip in time from one another.

Note that in coherent interpolation, interpolation is applied directly onto complex-valued CAF samples. As a result, both the interpolated and the original CAF samples have substantially similar probability density functions. Accordingly, during peak detection, a common detection threshold can be applied to all samples. This is illustrated in FIG. 7 by threshold blocks 716-{1, ..., n} having the same threshold value T.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for signal acquisition, comprising:
   (a) receiving a sampled complex baseband signal representative of a complex envelope of a received signal;
   (b) low-pass filtering the received sampled signal to generate a filtered sampled signal;
   (c) decimating the filtered sampled signal to reduce a sample rate thereof;
   (d) cross-correlating the decimated filtered sampled signal in time and frequency with a locally-generated replica thereof to generate a sampled cross ambiguity function (CAF) having samples spaced in time according to the sample rate of the decimated filtered sampled signal;
   (e) interpolating the sampled CAF in time and frequency over the entirety of a time-frequency domain of the sampled CAF to generate a second CAF, wherein the second CAF has at least two times a number of samples as the sampled CAF, and wherein said interpolating comprises interpolating complex-valued samples of the sampled CAF, thereby performing a coherent interpolation of the sampled CAF;
   (f) detecting a correlation peak in the second CAF; wherein said detecting comprises applying a common peak detection threshold to both interpolated and non-interpolated samples of the second CAF; and
   (g) estimating a peak value of the detected correlation peak, wherein the peak value corresponds to an estimated pair of time and frequency offsets between the filtered sampled signal and the locally generated replica.

2. The method of claim 1, wherein the received signal is a spread spectrum signal.

3. The method of claim 1, wherein the sample rate of the filtered sampled signal following step (c) is equal to one sample per chip.

4. The method of claim 1, wherein the sample rate of the filtered sampled signal following step (c) is lower than 2 samples per chip.

5. The method of claim 1, wherein interpolated and non-interpolated samples of the second CAF have substantially similar probability density functions.

6. The method of claim 1, wherein interpolating the sampled CAF in step (e) is performed using a plurality of 2-tap filters.

7. The method of claim 6, wherein specific tap weights applied to the plurality of 2-tap filters are set according to noise power in the received signal.

8. A method for signal acquisition comprising:
   (a) receiving a sampled complex baseband signal representative of a complex envelope of a received signal;
   (b) low-pass filtering the received sampled signal to generate a filtered sampled signal;
   (c) decimating the filtered sampled signal to reduce a sample rate thereof;
   (d) cross-correlating the decimated filtered sampled signal in time and frequency with a locally-generated replica thereof to generate a sampled cross ambiguity function (CAF) having samples spaced in time according to the sample rate of the decimated filtered sampled signal;
   (e) repeating steps (a)-(d) multiple times to generate multiple sampled CAFs and performing a non-coherent integration of magnitudes of the multiple sampled CAFs to generate a real-valued sampled CAF;
   (f) interpolating the real-valued sampled CAF in time and frequency over the entirety of a time-frequency domain of the sampled CAF to generate a second CAF, wherein the second CAF has at least two times a number of samples as the sampled CAF, and wherein said interpolating comprises interpolating real-valued samples of the real-valued sampled CAF, thereby performing a non-coherent interpolation;
   (g) detecting a correlation peak in the second CAF; and
   (h) estimating a peak value of the detected correlation peak, wherein the peak value corresponds to an estimated pair of time and frequency offsets between the filtered sampled signal and the locally-generated replica.

9. The method of claim 8, wherein interpolated and non-interpolated samples of the second CAF have different probability density functions.

10. The method of claim 8, wherein step (g) further comprises:
   applying a plurality of peak detection thresholds to the interpolated and non-interpolated samples of the second CAF.

11. The method of claim 8, wherein step (g) further comprises:
applying a common peak detection threshold to both interpolated and non-interpolated samples of the second CAF.

12. The method of claim 1, wherein interpolating the real-valued sampled CAF in frequency in step (f) is performed using a zero-padded Discrete Fourier Transform (DFT) while generating the sampled CAF.

13. A system for signal acquisition, comprising:
means for receiving a sampled complex baseband signal representative of a complex envelope of a received signal;
means for low-pass filtering the received sampled signal to generate a filtered sampled signal;
means for decimating the filtered sampled signal to reduce a sample rate thereof;
means for cross-correlating the decimated filtered sampled signal in time and frequency with a locally-generated replica thereof to generate a sampled cross ambiguity function (CAF) having samples spaced in time according to the sample rate of the decimated filtered sampled signal;
means for repeating the sequence of receiving, low-pass filtering, decimating, and cross-correlating multiple times to generate multiple sampled CAFs;
means for non-coherently integrating magnitudes of the multiple sampled CAFs to generate a real-valued sampled CAF;
means for interpolating the real-valued sampled CAF in time and frequency to generate a second CAF, wherein the second CAF has at least two times a number of samples as the sampled CAF, and wherein said means for interpolating interpolates real-valued samples, thereby performing a non-coherent interpolation;
means for detecting a correlation peak in the second CAF; and
means for estimating a peak value of the detected correlation peak, wherein the peak value corresponds to an estimated pair of time and frequency offsets between the filtered sampled signal and the locally generated replica.

14. The system of claim 13, wherein the received signal is a spread spectrum signal.

15. The system of claim 13, wherein said means for decimating reduces the sample rate of the filtered sampled signal to one sample per chip.

16. The system of claim 13, wherein said means for decimating reduces the sample rate of the filtered sampled signal to lower than 2 samples per chip.

17. A method for signal acquisition, comprising:
(a) receiving a sampled complex baseband signal representative of a complex envelope of a received signal;
(b) low-pass filtering the received sampled signal to generate a filtered sampled signal;
(c) decimating the filtered sampled signal to reduce a sample rate thereof;
(d) cross-correlating the decimated filtered sampled signal in time and frequency with a locally-generated replica thereof to generate a sampled cross ambiguity function (CAF) having samples spaced in time according to the sample rate of the decimated filtered sampled signal;
(e) interpolating the sampled CAF in time and frequency to generate a second CAF, wherein the second CAF has at least two times a number of samples as the sampled CAF; and
(f) detecting a peak value in the second CAF, wherein the peak value corresponds to an estimated pair of time and frequency offsets between the filtered sampled signal and the locally generated replica;
wherein step (e) comprises interpolating complex-valued samples of the sampled CAF, thereby performing a coherent interpolation of the sampled CAF, and wherein interpolated and non-interpolated samples of the second CAF have substantially similar probability density functions.

18. A method for signal acquisition, comprising:
(a) receiving a sampled complex baseband signal representative of a complex envelope of a received signal;
(b) low-pass filtering the received sampled signal to generate a filtered sampled signal;
(c) decimating the filtered sampled signal to reduce a sample rate thereof;
(d) cross-correlating the decimated filtered sampled signal in time and frequency with a locally-generated replica thereof to generate a sampled cross ambiguity function (CAF) having samples spaced in time according to the sample rate of the decimated filtered sampled signal;
(e) interpolating the sampled CAF in time and frequency to generate a second CAF, wherein the second CAF has at least two times a number of samples as the sampled CAF;
(f) detecting a peak value in the second CAF, wherein the peak value corresponds to an estimated pair of time and frequency offsets between the filtered sampled signal and the locally-generated replica; and
(g) performing a non-coherent integration of magnitudes of multiple sampled CAFs to generate a real-valued sampled CAF, and wherein step (e) comprises interpolating real-valued samples of the sampled CAF, thereby performing a non-coherent interpolation of the sampled CAF.

19. A system for signal acquisition, comprising:
means for receiving a sampled complex baseband signal representative of a complex envelope of a received signal;
means for low-pass filtering the received sampled signal to generate a filtered sampled signal;
means for decimating the filtered sampled signal to reduce a sample rate thereof;
means for cross-correlating the decimated filtered sampled signal in time and frequency with a locally-generated replica thereof to generate a sampled cross ambiguity function (CAF) having samples spaced in time according to the sample rate of the decimated filtered sampled signal;
means for interpolating the sampled CAF in time and frequency over the entirety of a time-frequency domain of the sampled CAF to generate a second CAF, wherein the second CAF has at least two times a number of samples as the sampled CAF, and wherein said means for interpolating comprises means for interpolating complex-valued samples of the sampled CAF, thereby performing a coherent interpolation of the sampled CAF;
means for detecting a correlation peak in the second CAF, wherein said detecting comprises applying a common peak detection threshold to both interpolated and non-interpolated samples of the second CAF; and
means for estimating a peak value of the detected correlation peak, wherein the peak value corresponds to an estimated pair of time and frequency offsets between the filtered sampled signal and the locally-generated replica.

* * * * *